May 7, 1968 W. B. CRANE Re. 26,386

SHIPPING CONTAINER

Original Filed June 3, 1964

4 Sheets-Sheet 1

INVENTOR.
Walton B. Crane,
BY
Irish, Lockwood, Dunnavant & Drury
Attys

SHIPPING CONTAINER

Original Filed June 3, 1964 4 Sheets-Sheet

INVENTOR.
Walton B Crane,
BY
Grist, Lockwood, Greenawalt & Dewey
Attys

May 7, 1968

W. B. CRANE

SHIPPING CONTAINER

Re. 26,386

Original Filed June 3, 1964

4 Sheets-Sheet 3

INVENTOR.

Walton B Crane,

BY

Grist, Lockwood, Grunewald & Dewey

Attys.

SHIPPING CONTAINER
Original Filed June 3, 1964 4 Sheets-Sheet 4
Fig. 7
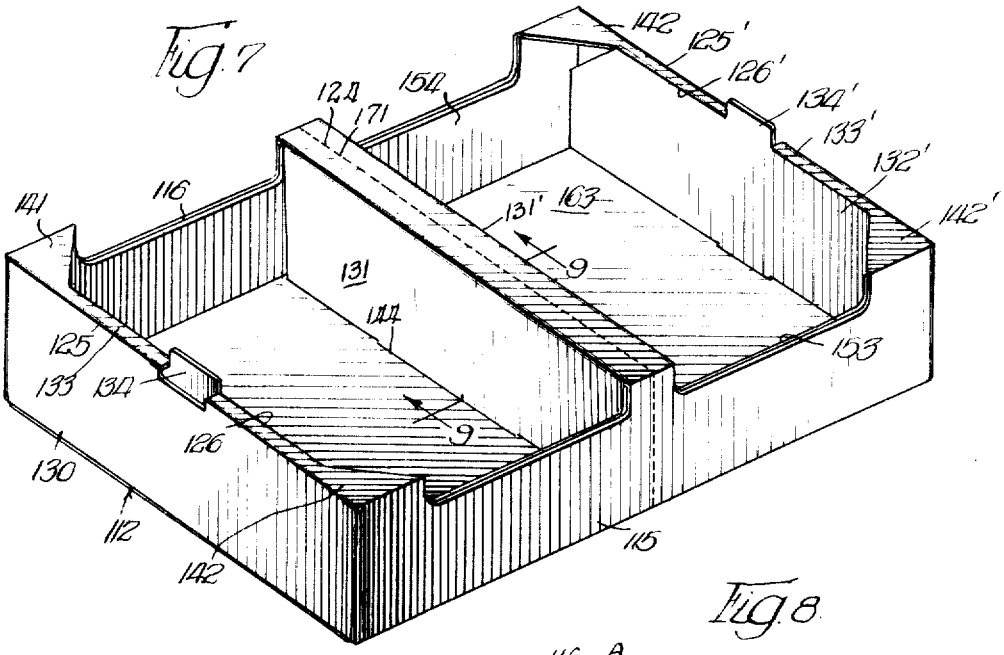
Fig. 8
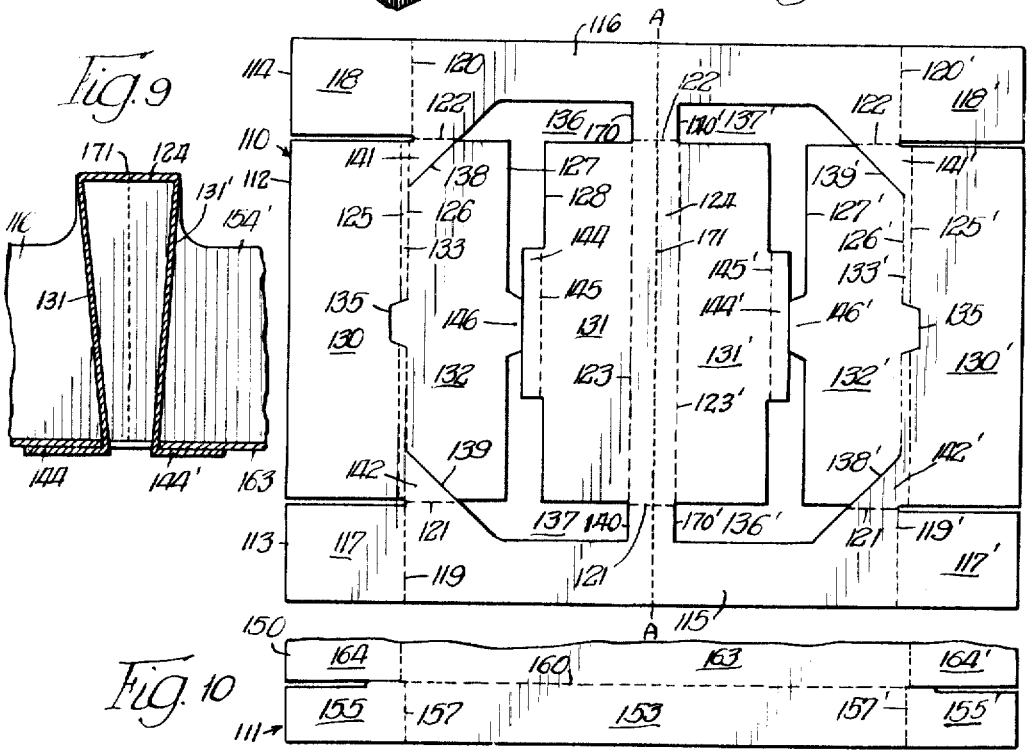
Fig. 9
Fig. 10
INVENTOR.
Walton B Crane,
BY
Dreist, Lockwood, Greenawalt & Dewey.
Attys United States Patent Office Re. 26,386

Reissued May 7, 1968

26,386

SHIPPING CONTAINER

Walton B. Crane, Sherman Oaks, Calif., assignor to Allied Plastics Company, Los Angeles, Calif., a corporation of California Original No. 3,194,472, dated July 13, 1965, Ser. No. 372,307, June 3, 1964, which is a continuation-in-part of Ser. No. 235,615, Nov. 6, 1962, now abandoned. Application for reissue Feb. 2, 1967, Ser. No. 632,833
15 Claims. (Cl. 229—23)

Matter enclosed in heavy brackets [ ] appears in the original patent but forms no part of this reissue specification; matter printed in italics indicates the additions made by reissue.

*ABSTRACT OF THE DISCLOSURE*

*A tray-like shipping container fabricated from a pair of generally rectangular paperboard blanks. The blanks are arranged so that, when folded into and secured in container-forming relation, the resulting container has multi-panel side and end walls.*

*A method of forming such container in which the two blanks are cut and creased to provide a plurality of foldable panels, including side and end panels, top and bottom panels, corner connecting panels, end wall reinforcing panels, and cross partition forming panels. Corresponding sidewall forming panels are positioned in overlapping relation and secured together to form a tube, which is opened up, and then corresponding end wall forming and reinforcing panels, corner connecting panels, and cross partition forming panels are folded into position and secured therein.*

This application is a continuation-in-part of my application Serial No. 235,615, filed November 6, 1962, now abandoned.

This invention relates to shipping containers and is more particularly concerned with improvements in containers which are fabricated from reinforced paperboard stock, preferably corrugated board, and which are so constructed that they have adequate strength, rigidity and resistance to crushing when a multiplicity of the crates are stacked in vertically disposed relation for shipment, storage or the like.

In the handling of certain products, for example, fresh produce such as berries, shipping containers which are fabricated of corrugated paperboard stock have become increasingly popular and a variety of designs have been employed for such containers in an effort to meet the relatively high standards of rigidity and resistance to bowing and crushing of the walls which result from the conditions under which the containers are used and still keep their cost low enough to compete with the wooden containers which they are designed to replace. Frequently, shipping containers for berries are stacked in the field, prior to use, in areas where there is considerable moisture, particularly in the early morning, and after the containers are filled or packed with the produce they are generally subjected to humidified cold storage conditions for a substantial period of time. Many paperboard containers previously designed, particularly those which have been fabricated from a single blank, have not proven satisfactory because of insufficient wall strength so that when weakened by moisture absorption, the side walls bow or buckle and the bottom wall sags under the weight of the contents when the filled container is picked up by the ends, or the side and end walls of the bottom containers give way when the containers are stacked or piled on each other in the usual numbers for transportation or storage, resulting in damage to the contents. Efforts to increase the strength of the single blank containers by providing multiple thicknesses of material in the vertical walls have not been successful because the increase in cost due to the extra blank material which is required for adequate reinforcement or the need for special machinery for setting up the containers does not permit the paperboard product to compete successfully with containers furnished for this purpose which are made of wood or other more rigid materials. The need for a corrugated board container for use in this and other related fields which can be manufactured from a minimum of material so as to compete economically with containers of wood or similar materials and which will withstand the hard usage encountered in field packing, storage and shipment of berries and similar products, even when weakened by exposure for substantial periods to moisture conditions frequently prevailing in berry handling operations, has long been recognized. A general object of the present invention is to provide a corrugated board container for this and other uses which may be fabricated from corrugated paperboard blanks arranged so as to obtain maximum use of material and high strength multi-ply vertical walls at a cost enabling it to compete economically with containers of wood or other more rigid sheet materials.

It is a more specific object of the invention to provide a shipping container fabricated from a pair of blanks of corrugated board stock wherein the blanks are cut, creased or scored, and folded in assembled relation to provide double thickness side walls upstanding from the bottom wall, and upstanding end walls having multiple plies of the board material connected in such a manner as to afford a rigid reinforced corner end wall construction.

It is a further object of the invention to provide a tray-like produce shipping container or crate fabricated from a pair of blanks of corrugated board stock wherein the blanks are cut, creased or scored, and folded in assembled relation to provide double thickness side walls upstanding from the bottom wall, end walls having multiple plies of the board material connected into face-to-face relation so as to provide rigid reinforcement at the corners, and a cross partition in which two panels are cut from the top wall and folded down from a top cross strip and provided with glue flaps having substantial length which extend through a slot in the bottom wall and which are folded over in opposite directions and glued or otherwise secured to the bottom wall surface.

It is a still more specific object of the invention to provide a tray-like produce shipping container or crate formed from a pair of blanks of corrugated board material which are cut and creased to provide, when set up, a bottom wall double thickness side walls, multiple thickness end walls, and a medial cross partition, the cross partition comprising a pair of panels folded downwardly about a top edge forming strip or crease, and having relatively narrow tops of substantial length extending along the bottom edge which project through a cross slot in the bottom wall and which are folded in opposite directions and secured to the bottom surface of the bottom wall so as to provide a rigid cross partition structure which is permanently secured to the bottom wall to prevent lateral sag, and the end walls comprising a pair of full length panels integrally hinged to the top and bottom walls, respectively, and secured at opposite ends to inturned flaps connecting the same with both plies of the sides walls and with the full length downwardly folded inner panel which is latched to the bottom wall, thereby affording five thicknesses of material in the end walls at the corners of the container.

It is a still further object of the invention to provide a tray-like produce shipping container or crate formed from two separate blanks which are cut and creased to provide, when set up, top and bottom tray forming members with the bottom tray forming member having a bottom wall forming panel and integral side and end wall panels folded upwardly along the side and end edges thereof and the top tray forming member having a top wall panel and integral side and end wall panels folded downwardly along the side and end edges thereof and disposed in telescoped relation over the bottom tray forming member so that the top side and end walls overlap the corresponding bottom side and end wall panels and cover the outside faces thereof, the overlapping side and end wall panels being secured to each other in rigid face engaging relation, the top tray member having end wall reinforcing panels cut therein which are each integrally hinged along an inner top edge strip to the top and end wall forming panels and which are folded down into oppositely disposed relation with the upwardly folded bottom end wall forming panels, each bottom end wall forming panel having a handle receiving cross slot which is aligned with a handle receiving slot in the center of the associated top edge strip, each end wall reinforcing panel having a locking tongue on its bottom edge which is seated in the cross slot in the bottom wall forming panel and spaced inwardly of the latter in the center thereof a distance approximately equal to the two thicknesses of the panel material, the corner connecting flaps being integrally hinged to each of the opposite ends of each of the top and bottom side wall forming panels and being folded inwardly and sandwiched between the end wall forming panels and the end wall reinforcing panels and terminating short of the center of the end walls whereby to provide five panel thicknesses, at least in part, in the end portion of each end wall and to space the end wall reinforcing panels from the center portions of the end wall panels so as to define pockets therebetween for accommodating portions of the handle members for the container.

It is another object of the invention to provide in a produce shipping tray of the type described a medial cross partition which comprises a pair of panels cut from the top wall and folded down about the opposite edges of a top cross strip of substantial width, the panels having narrow flaps of substantial length extending along the bottom edges and projecting through a cross slot of substantial width in the bottom wall, and folded in opposite directions and secured to the bottom surface of the bottom wall whereby to provide a rigid partition structure which is permanently secured to the bottom wall and prevents bottom sag and which enables the tray to be divided by cutting through the top strip in the medial cross partion, the side walls and the bottom wall so as to provide two rigid half size trays.

These and other objects and advantages of the invention will be apparent from a consideration of the shipping container which is shown by way of illustration in the accompanying drawings wherein:

FIGURE 7 is a top perspective view of a modified form of the shipping container;

FIGURE 8 is a top plan view of the top tray forming paperboard blank employed in fabricating the form of the container shown in FIGURE 7;

FIGURE 9 is a fragmentary section taken on the line 9—9 of FIGURE 8, to an enlarged scale; and FIGURE 10 is a partial plan view of a blank employed in fabricating the bottom tray forming portion of the container, illustrating a further modification thereof.

Referring to FIGURES 1 to 6 of the drawings, there is illustrated, by way of example, a container which embodies the principal features of the invention and which is adapted to be employed in the packaging and handling, storing and/or shipping of a plurality of filled berry boxes or baskets of well known construction commonly used for strawberries and the like.

Figure 1:
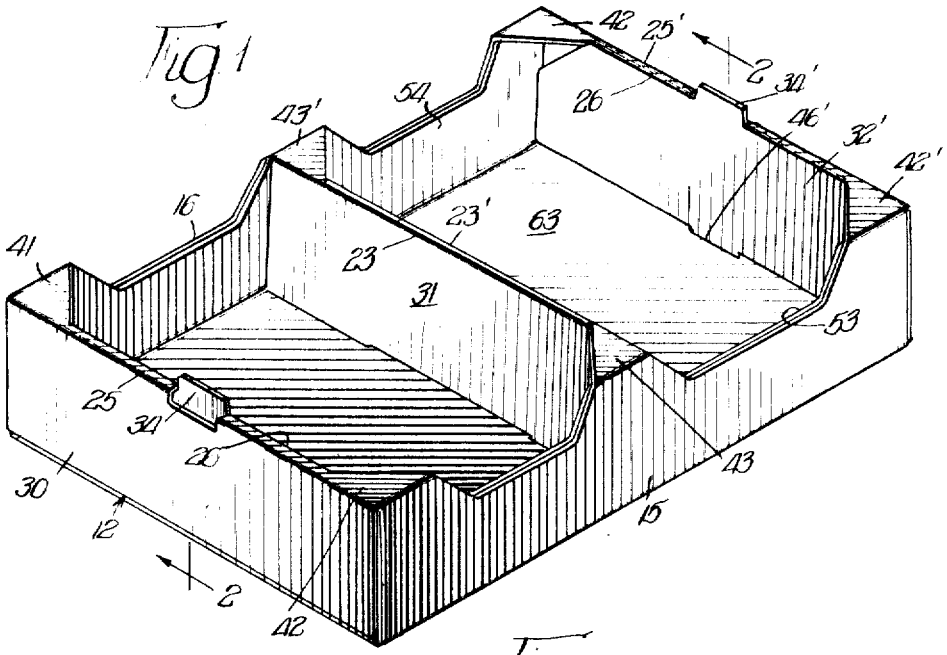
FIGURE 1 is a top perspective view of a produce shipping container which embodies therein the principles of the invention.
Figure 2:
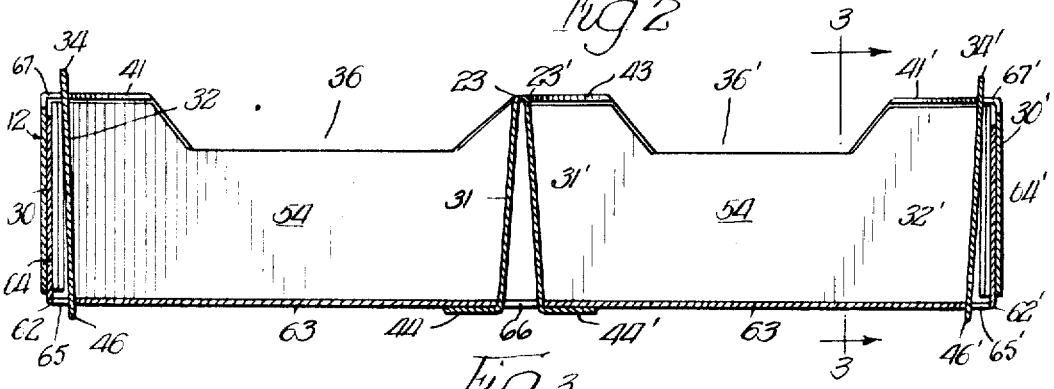
FIGURE 2 is a longitudinal section taken on the line 2—2 of FIGURE 1, to an enlarged scale.
Figure 3:
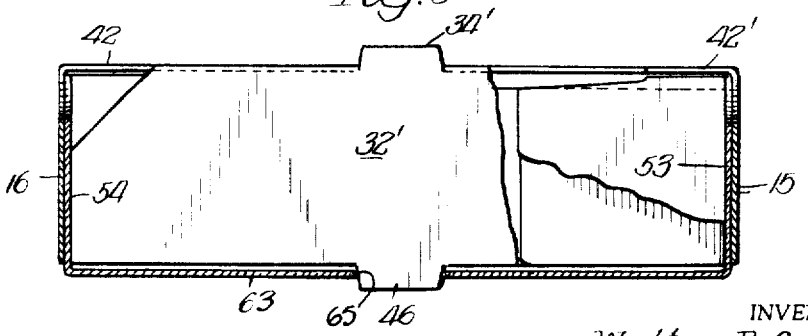
FIGURE 3 is a transverse section taken on the line 3—3 of FIGURE 2, with portions broken away.
Figure 4:
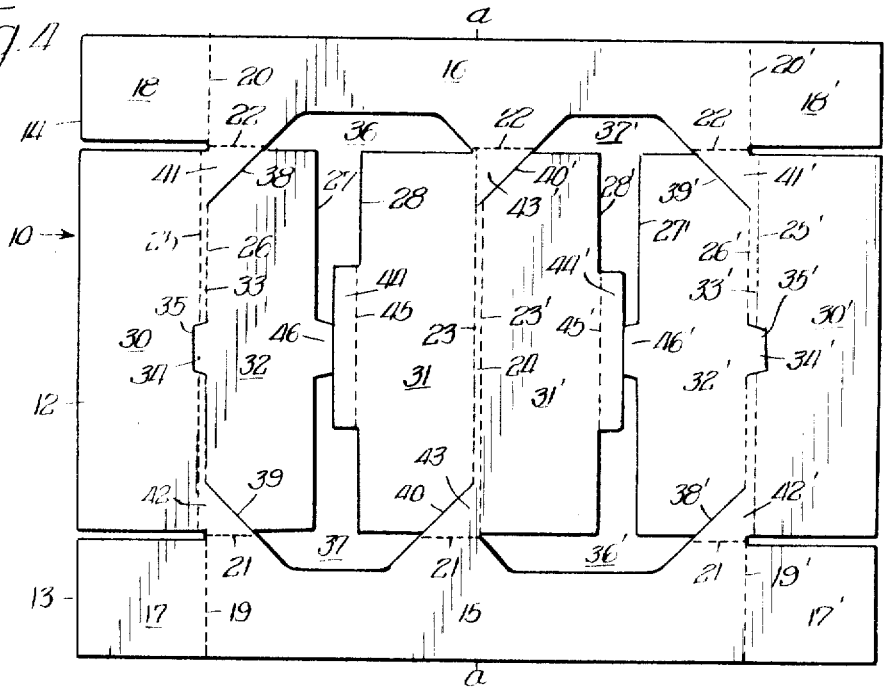
FIGURE 4 is a top plan view of the top forming paperboard blank employed in fabricating the container of FIGURE 1.
Figure 5:
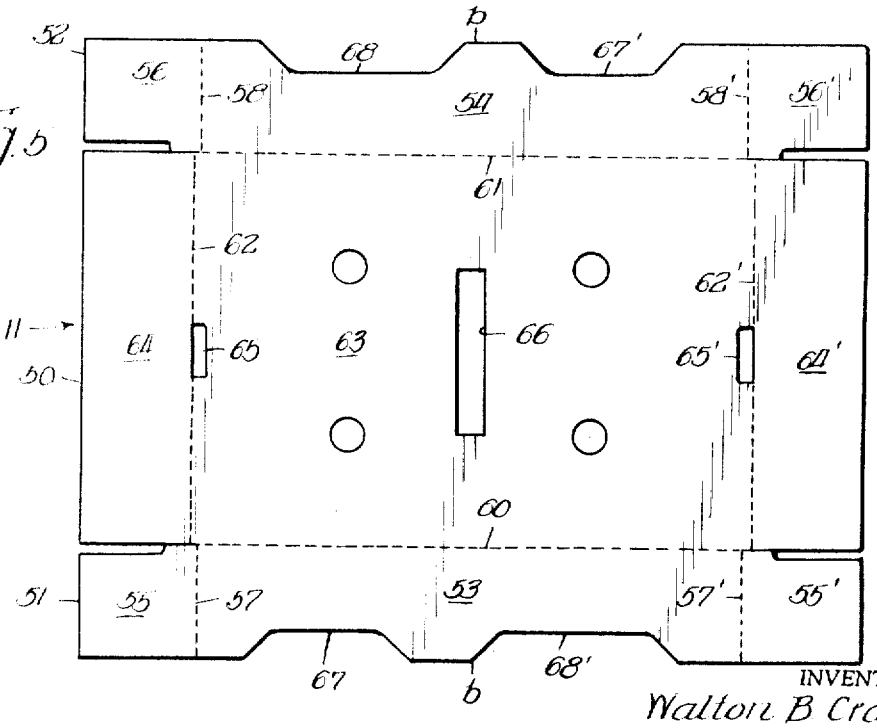
FIGURE 5 is a top plan view of the paperboard blank employed in fabricating the bottom forming portion of the container of FIGURE 1.

The tray or berry crate illustrated in FIGURES 1 to 6 is fabricated from a pair of blanks 10 and 11, each of generally rectangular shape, which are cut and scored or creased, as illustrated in FIGURES 4 and 5. The cut and scored blanks 10 and 11 are symmetric about transversely extending medial lines a—a and b—b. Accordingly, for simplicity, one set of reference numerals will be employed to designate corresponding parts and/or relationships on one side of the medial lines a—a and b—b while the same numerals primed will be employed to designate like parts on the opposite side of the medial lines.

The top forming blank 10 is divided on longitudinal lines into a central partition and end wall forming section 12 and adjoining side and end wall or corner connecting flap forming side sections 13 and 14. The side wall and corner connecting flap forming sections 13 and 14 are subdivided into side wall forming panels 15 and 16 and corner connecting flaps 17, 17' and 18, 18' which are separated from the side wall panels by transverse score lines 19, 19' and 20, 20' and which are freed of the end portions of the center section 12 of the blank by cutting longitudinal slots therein which terminate at the ends of longitudinally extending, parallel crease lines 21 and 22, the latter separating the side wall panels 15 and 16 from the center section of the blank.

The central partition and end wall forming section 12 of the blank 10 is subdivided at the center thereof by transversely extending, longitudinally spaced, parallel hinge forming crease lines 23 and 23' which straddle the medial line A—A and which form between them a relatively narrow cross partition top wall panel or edge 24. The portions of section 12 of the blank on opposite sides of the crease lines 23 and 23' are further subdivided by transversely extending, longitudinally spaced, hinge forming crease lines 25, 26 and 25', 26' and by transversely extending, longitudinally spaced pairs of slitting lines 27, 28 and 27', 28'. The crease lines 25, 26 and 25', 26' separate from the center of the section 12 end wall forming panels 30 and 30'. The slits 27, 28 and 27', 28' define the free edges of cross partition forming panels 31, 31' and of inner end wall forming panels 32, 32'. The cross partition forming panels 31 and 31' are integrally hinged to the center cross partition top edge strip 24 on the crease lines 23 and 23'. The inner end wall forming panels 32 and 32' are integrally hinged to relatively narrow and longitudinally extending end wall forming sections 33 and 33' which are formed between the inner hinge forming crease lines 26 and 26' and the outer crease lines 25 and 25'. Locking tab formations 34 and 34' are provided on the hinge edges of the inner end wall panels 32 and 32' by generally U-shaped cutting lines 35 and 35' in the center of the top wall forming sections 33 and 33' and which extend slightly into the adjoining outer end wall forming panels 30 and 30'. The cross partition panels 31 and 31' and the inner end wall panels 32 and 32' are separated from the side wall panels 15 and 16 by elongate slots 37 and 38 and 36', 37' extending into the side wall panels and by diagonally extending slits 38, 39, 40 and 38', 39', 40'. The slits 38, 39 and 38', 39' extend from the ends of the slots 36, 37 and 36', 37' to the ends of the crease lines 26 and 26′ and free the inner end wall panels 32 and 32′ for hinging movement about the crease lines 26 and 26′ while the slits 40 and 40′ extend from the ends of the slots 37 and 37′ to the ends of the crease lines 23 and 23′ and free the inner partition panels for hinging movement about the crease lines 23 and 23′. This leaves the outer end wall panels 30 and 30′ connected to the outermost side wall panels 15 and 16 by triangular connecting web portions 41, 42 and 41′, 42′. The slits 40 and 40′ are on diagonally opposite sides of the cross partition top edge strip 24 and at the opposite ends of the latter so that the cross partition panels 31 and 31′ are connected to the top edge strip 24 and to the adjacent outermost side wall panels 15 and 16 by triangular web formations 43 and 43′. The cross partition forming panels 31 and 31′ are provided at their free edges 28 and 28′ with glue flaps 44 and 44′ which are adapted to hinge about the transverse score lines 45 and 45′, the latter being aligned approximately with the cutting lines 28 and 28′. The inner end wall panels 32 and 32′ are provided with tabs or tongues 46, 46′ at their inner edges 27 and 27′ for locking or latching these panels in end wall forming position by engagement of the latching tongues in co-operating slots in the bottom wall. The blank 10 is cut and scored as described and is adapted to form the top wall and portions of the sides and end walls and the transverse partition, when assembled with the bottom forming blank 11, in the set up condition of the crate.

The bottom forming blank 11 is divided into a central bottom wall and end wall forming section 50 and two adjoining side wall and corner connecting flap sections 51 and 52. The side wall forming sections 51 and 52 are subdivided into side wall forming panels 53 and 54 and corner connecting flaps 55, 55′ and 56, 56′ by hinge forming, longitudinally spaced, transverse crease or score lines 57, 58 and 57′, 58′. The side wall panels 53 and 54 are separated from the central portion of the center blank section 50 by transversely spaced, longitudinally extending, parallel hinge forming crease lines 60 and 61. The blank section 50 is subdivided by longitudinally spaced, transversely extending, parallel crease lines 62 and 62′ into a bottom wall forming panel 63 and end wall forming panels 64 and 64′. The corner connecting flaps 55, 56 and 55′, 56′ are freed from the adjoining end wall forming panels 64 and 64′ along partly slotted, partly cut lines extending from the intersection of the crease lines 60 and 61 with the crease lines 57, 57′ and 58, 58′. The bottom wall panel 63 has generally rectangular slots 65, 65′ cut therein at the center of the bottom edge forming crease lines 62, 62′ for co-operation with the locking or latching tongues 46 and 46′ on the inner end wall forming panels 32 and 32′. A relatively large elongate rectangular slot 66 is cut in the center of the blank and extends transversely thereof for receiving the flaps 44 and 44′ on the cross partition panels 31 and 31′. The side wall panels 53 and 54 are cut out at 67, 67′ and 68, 68′ to provide an edge contour corresponding to the top edge contour of the side wall panels 15, 16 which is defined by the outside edges of the slots 36, 36′ and 37, 37′ in the blank 10.

Figure 6:
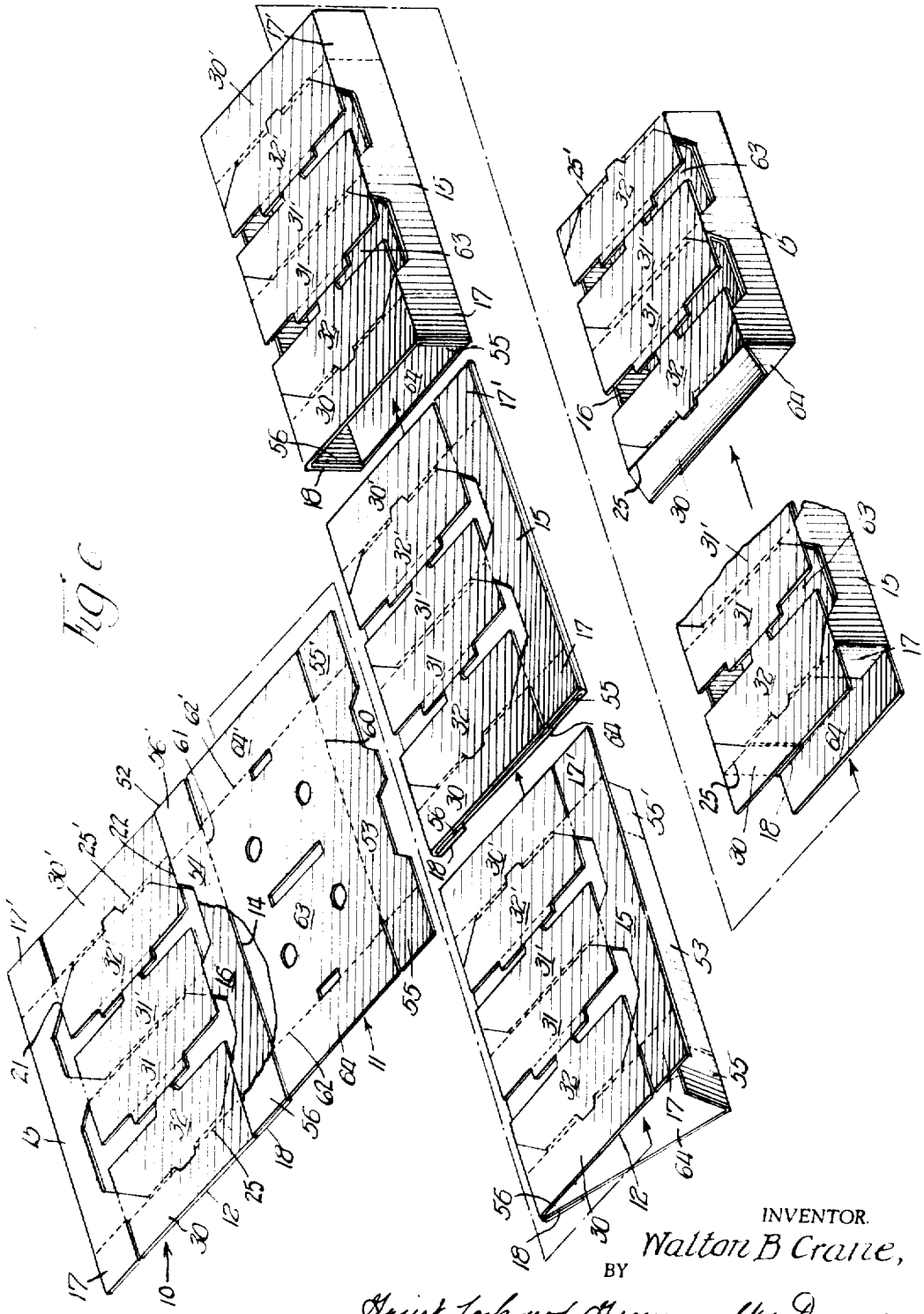
FIGURE 6 is a diagrammatic perspective view showing the method of assembling and folding the blanks to form the container of FIGURE 1.

In setting up the tray or crate, the blanks 10 and 11, cut and creased as shown, are assembled and connected together by overlapping one of the side wall forming sections of the one blank and securing the same, preferably by an adhesive, to the corresponding side wall section of the other blank. For example, section 52 of blank 11 may be secured to section 14 of the blank 10 as shown in FIGURE 6. The two blanks 10 and 11 are then advanced to a folding machine which folds them about the crease lines 21, 22, 60 and 61 bringing the outer side wall forming panels 15 and 16 into overlapping engagement with the inner side wall panels 53 and 54 and securing the overlapped panels together, thus forming the two blanks into a tube with the corner connecting flaps 18 and 18′ secured to the flaps 55 and 55′. The end walls are formed by folding inwardly the corner connecting and reinforcing panels 17, 55, 17′, 55′ and 18, 56, 18′, 56′, after which the end wall panels 64 and 64′ are folded upwardly about the crease lines 62 and 62′ and secured to the corner connecting flaps 17, 17′ and 18, 18′. The outer end wall panels 30 and 30′ are then folded down about the crease lines 25 and 25′ and secured to the inner end wall panels 64 and 64′. Thereafter, as seen from FIGURES 1 to 3, the inner end wall panels 32 and 32′ are folded downwardly about the hinge lines 26, 26′ and the locking tabs 46, 46′ are engaged in the slots 65, 65′ which are vertically aligned with the slots 67, 67′ formed by cutting the tabs 34 and 34′ through the top edge strips 33 and 33′ and which are adapted to receive handle forming members or ties of wire or other suitable material, the inner end wall panels 32 and 32′ being spaced from the center portions of the panels 64 and 64′ by the infolded double thickness forming corner connecting panels 17, 55, 17′, 55′ and 18, 56, 18′, 56′ so as to form a pocket or recess between the same for accommodating the handle or tie members. Finally, the center partition panels 31 and 31′ are folded down about the crease lines 23 and 23′ and the flaps 40 and 44′ are passed through the slot 66 in the bottom wall panel 63 and then folded back against the outside face of the bottom wall 63 about the crease lines 45 and 45′ and secured in rigidly connected relation with the bottom face of the bottom wall panel 63. This completes the assembly and setting up of the crate. The overlapping side wall and end wall forming panels and corner connecting flaps are secured together by suitable adhesive, stapling or other connecting means thereby providing rigid connections between the same and resulting in double ply side walls, a minimum of three plies in the end walls and five plies in the end walls adjacent the corners which affords adequate resistance to crushing due to vertical stresses when the crates are stacked in the desired numbers during shipment and storage.

An alternative method of setting up the tray or crate comprises: folding the center partition forming panels 31, 31′ and the inner end wall forming panels, 32, 32′ in the top forming blank 10 into planes extending at right angles to the body of the blank; positioning the bottom forming blank 11 in parallel relation, with the blank 10 so that glue flaps 44, 44′ extend into slot 66 and locking tabs 34, 34′ extend into the slots 65, 65′; folding the outer side wall forming panels 15 and 16 into overlying relation with the inner side wall forming panels 53, 54 and securing the same to each other; folding the corner connecting panels 17, 55, 17′, 55′ and 18, 56, 18′, 56′ into the plane of the end walls; folding the end wall panels 30, 30′ into overlying relation with the end wall panels 64, 64′ and into the plane of the respective end walls and securing the end wall panels together; and finally folding over and securing the glue flaps 44 and 44′ onto the outside face of the bottom wall panel 63, the securing means for the panels being preferably an adhesive so as to obtain maximum rigidity in the side and end walls of the tray.

A modified form of the tray or crate is illustrated in FIGURES 7 to 9. This form of the crate is fabricated from a pair of blanks, each of generally rectangular shape, which are cut and scored or creased to provide top and bottom tray sections. The blank for the bottom of the tray may correspond to the blank of FIGURE 5 except for a slight change in the dimensions of the bottom forming panel. The blank for the top section of the tray corresponds to the blank of FIGURE 4 except for the medial partition members. In order to eliminate duplication in describing this form of the invention, the blank for the bottom section of the tray in FIGURE 7 is not illustrated. The blank for the top section of the tray is illustrated in FIGURE 8. Also, where portions of the top and bottom forming blanks correspond to portions of the blanks of FIGURES 4 and 5 they will be identified by the same numerals plus 100. Referring then to FIGURE 8, the blank 110 for forming the top tray section of the crate of FIGURE 7, when cut and scored, is symmetric about the transversely extending medial line A—A. The blank 110 is divided on longitudinal lines into a central partition and end wall forming section 112 and adjoining side and end walls and corner connecting flap forming side sections 113 and 114. The side wall and corner connecting flap forming sections 113 and 114 are subdivided into side wall forming panels 115 and 116 and corner connecting flaps 117, 117' and 118, 118' which are separated from the side wall panels by transverse score lines 119, 119' and 120, 120' and which are freed at the ends of the center section 112 of the blank by cutting longitudinal slots therein which terminate at the ends of longitudinally extending, parallel crease lines 121, 122, the latter separating the side wall panels 115 and 116 from the center section 112 of the blank. The central partition and end wall forming section of the blank 110 is subdivided at the center thereof by transversely extending, longitudinally spaced, parallel hinge forming crease lines 123 and 123' which straddle the medial line A—A and which form between them a cross partition top wall panel 124 of substantial width. The portions of this section 112 of the blank on opposite sides of the crease lines 123 and 123' are further subdivided in substantially the same manner as in the blank 10 of FIGURE 4 except that the web portions 43 and 43' of FIGURE 4 are omitted and the slots 136 136' and 137, 137' which are cut in the side wall panels 115 and 116, extend to transverse cutting lines 140, 140' and 170, 170' which are substantially aligned with the crease lines 123 and 123'. A dividing or cutting line 171 is printed or otherwise indicated in the panels 124 which coincides approximately with the line A—A.

In setting up the modified form of the crate the cut and creased blanks may be assembled and connected together in the same manner as the blanks of FIGURES 4 and 5 to provide the crate illustrated in FIGURE 7.

In a further modification of the crate, a bottom tray forming blank is employed which is illustrated at 111 in FIGURE 10. The blank 111 may be employed in either the crate shown in FIGURE 1 or the modified crate of FIGURE 7 in order to reduce somewhat the amount of material used in the crate and still obtain a high degree of strength and durability. The blank 111 corresponds to the bottom tray forming blank 11 of FIGURE 5, except as shown, and with the necessary change in dimensions when employed in combination with the blank of FIGURE 8. The blank 111 is symmetrical about longitudinal and transverse center lines and the center section is cut and creased in the same manner as in FIGURE 5, corresponding parts being indicated in the blank 111 by the same numerals plus 100. The side sections of the blank 111 are reduced in size which reduces the overall width of the blank required and straight side edges are provided with the side wall forming panels along each side, one of which is indicated at 153, being of a width approximately half the width of the corresponding side wall panels in the blank 110. The corner connecting flaps or panels 155, 155' and the corresponding flaps along the opposite side edge of the blank 111 are cut the same width as the side wall panel 153.

When the blank 111 is combined with either the blank 10 of FIGURE 4 or the blank 110 of FIGURE 8 to fabricate the crate, the inner side wall panels and the corner connecting flaps which are hinged at the ends thereof extend upwardly from the bottom wall panel approximately half the depth of the outer side wall panels and the end walls and are rigidly attached thereto so as to form a strong rigid side wall and end wall structure which will withstand crushing and twisting forces normally encountered in the use of the crates.

The illustrated constructions result in a crate having greater strength and rigidity than heretofore provided with single blank constructions and the additional material required can be obtained without increased cost since the construction lends itself to the use of cheaper grade board stock. The top forming blank may be cut from stock having only one surface suitable for printing since the nonprinted surface will not be visible in the finished crate. The bottom forming blank may be cut from less expensive stock since it is visible only on the inside walls of the crate where a finished appearance is not required.

While particular materials and specific details of construction are referred to in describing the form of the container illustrated in the drawings, it will be understood that other materials and equivalent details of construction may be resorted to within the spirit and scope of the invention.

I claim:

1. A tray-like shipping container which is fabricated from two separate corrugated paperboard blanks, said blanks being cut and scored so as to provide, when folded and secured in container forming relation, multi-panel side and end walls and a substantially open top wall, one of said blanks constituting a bottom tray forming member having a bottom wall forming panel and integral side and end wall forming panels folded upwardly therefrom along the side and end edges and the other one of said blanks constituting a top tray forming member having a top wall forming panel and integral side and end wall forming panels folded downwardly therefrom along the side and end edges, said top member being telescoped over said bottom member with the top side and end wall forming panels overlapping corresponding bottom, side and end wall forming panels and disposed along the outside faces thereof, said overlapping side and end wall forming panels being secured to each other in face engaging relation, said top member having end wall reinforcing panels cut therein which are each integrally hinged along a narrow top end edge strip to a *corresponding one of the* top end wall forming [panel] *panels* and which are folded down inside the container into oppositely disposed relation with the upwardly folded bottom end wall forming panels, corner connecting flaps integrally hinged to each of the opposite ends of each of said top and bottom side wall forming panels of the top and bottom members, said corner connecting flaps being folded inwardly and rigidly secured between the end wall forming panels and the end wall reinforcing panels whereby five panel thicknesses are provided in end portions of each end wall with the panel portions being secured together in face contacting relation so as to form a rigid corner construction with high resistance to crushing forces resulting when the containers are stacked upon each other.

2. A tray-like shipping container which is fabricated from a pair of generally rectangular corrugated paperboard blanks, said blanks being cut and scored so as to provide in folded and container forming relation multipanel side and end walls and a substantially open top wall, one of said pair of blanks constituting a bottom tray forming member having a bottom wall forming panel and integral side and end wall panels folded upwardly along the side and end edges thereof and the other one of said pair of blanks constituting a top tray forming member having a top wall panel and integral side and end wall panels folded downwardly along the side and end edges thereof, said top member being disposed in telescoped relation over said bottom member so that the top, side and end wall panels overlap the corresponding bottom, side and end wall panels and cover the outside faces thereof, said overlapping side and end wall panels being secured to each other in rigid face engaging relation, said top member having end wall reinforcing panels cut therein which are each integrally hinged along an inner top end edge strip to [the] *a corresponding one of the* top end wall forming [panel] *panels* and which are folded down into oppositely disposed relation with the upwardly folded bottom end wall forming panels, said bottom end wall forming panel having a handle receiving cross slot adjacent the bottom end wall forming panel which is aligned with the handle receiving slot in the center of the associated top edge strip, said end wall reinforcing panel having a locking tongue on its bottom edge which is seated in said cross slot in the bottom wall forming panel and said end wall reinforcing panel being spaced inwardly of said bottom end wall forming panel in the center thereof a distance approximately equal to two thicknesses of the panel material, and corner connecting flaps integrally hinged to each of the opposite ends of each of said top and bottom side wall forming panels, said corner connecting flaps being folded inwardly and sandwiched between the end wall forming panels and the end wall reinforcing panels, and said corner connecting flaps terminating short of the center of said end walls whereby to provide five panel thicknesses in end portions of each end wall and to space the end wall reinforcing panels from the center portions of the end wall panels so as to define compartment forming recesses therebetween for accommodating handle members.

3. A tray-like shipping container as recited in claim 2, and said top tray member having cross partition forming panels cut therefrom which are integrally hinged to a narrow top cross strip intermediate the end walls of the container, said top cross strip being connected at its opposite ends by triangular web members with the top side wall forming panels and extending inwardly in the plane of the container top wall in hinged relation to the top side wall forming panels, and said cross partition forming panels having flaps of substantial length on the free edges thereof opposite their hinge connection which flaps extend through an elongate cross slot in the bottom wall forming panel of the bottom tray member and are turned over and rigidly secured to the bottom face of said bottom wall forming panel.

4. A tray-like shipping container which is fabricated from two separate corrugated paperboard blanks, said blanks being cut and scored so as to provide, when folded and secured in container forming relation multi-panel side and end walls and a substantially open top wall, one of said blanks forming in the container a bottom tray member having a bottom wall panel and integral side and end wall panels which are folded upwardly therefrom along the side and end edges and the other one of said blanks forming a top tray member having a top wall panel and integral side and end wall panels which are folded downwardly therefrom along the side and end edges, said top tray member being telescoped over said bottom tray member with the top side and end wall panels and disposed along the outside faces thereof, said overlapping side and end wall panels being secured to each other in face engaging relation, said top member having end wall reinforcing panels cut therein which are each integrally hinged along a narrow top end edge strip to a *corresponding one of the* top end wall [panel] *panels* and which are folded down inside the container into oppositely disposed relation with the upwardly folded bottom end wall panels, corner connecting flaps integrally hinged to each of the opposite ends of each of said top and bottom side wall panels of the top and bottom tray members, said corner connecting flaps being folded inwardly between the end wall panels and the end wall reinforcing panels, and said corner connecting flaps extending substantially the full depth of said end walls whereby five panel thicknesses are provided in the end portions of each end wall which are secured together in face contacting relation so as to form a rigid corner construction with high resistance to crushing forces resulting when the containers are stacked upon each other.

5. A tray-like shipping container as recited in claim 4, and said top tray member having cross partition forming panels cut from the center thereof which are integrally hinged to a top cross strip of substantial width intermediate the end walls of the container, said top cross strip being integrally connected at its opposite ends with top side wall forming panels and extending inwardly in the plane of the container top wall in hinged relation to the top side wall panels, and said cross partition forming panels having flaps of substantial length on the free edges thereof opposite their hinge connection which flaps extend through an elongate cross slot of substantial width in the center of the bottom wall panel of the bottom tray member and are turned over in opposite directions and rigidly secured to the bottom face of said bottom wall forming panel, and said top cross strip, side walls and bottom wall having a severance line indicating the longitudinal center of the container and providing a guide for dividing the container into two separate tray members.

6. A tray-like shipping container which is fabricated from two separate corrugated paperboard blanks, said blanks being cut and scored so as to provide, when folded and secured in container forming relation, multi-panel side and end walls and a substantially open top wall, one of said blanks forming in the container a bottom tray member having a bottom wall panel and integral side and end wall panels folded upwardly therefrom along the side and end edges of the bottom wall panel and the other one of said blanks forming a top tray member having a top wall panel and integral side and end wall panels folded downwardly therefrom along the side and end edges, said top tray member being telescoped over said bottom tray member with the top side and end wall panels overlapping corresponding bottom side and end wall panels and disposed along the outside faces thereof, said overlapping side and end wall panels being secured to each other in face engaging relation, said top member having end wall reinforcing panels cut therein which are each integrally hinged along a narrow top end edge strip to a *corresponding one of the* top end wall [panel] *panels* and which are folded down inside the container into oppositely disposed relation with the upwardly folded bottom end wall panels, corner connecting flaps integrally hinged to each of the opposite ends of each of said top and bottom side wall panels of the top and bottom tray members, said corner connecting flaps being folded inwardly between the end wall panels and the end wall reinforcing panels, said corner connecting flaps providing five panel thicknesses in portions of each end wall and the end wall panels and corner connecting panels being secured together in face contacting rigid relation so as to form a corner construction with high resistance to crushing due to weight when the containers are stacked upon each other.

7. A tray-like shipping container which is fabricated from two generally rectangular corrugated paperboard blanks, said blanks being cut and scored so as to provide in folded and container forming relation multi-panel side and end walls and a substantially open top wall, one of said blanks forming a bottom tray member having a bottom wall panel and integral side and end wall panels folded upwardly along the side and end edges of said bottom wall panel and the other one of said blanks constituting a top tray member having a top wall panel and integral side and end wall panels folded downwardly along the side and end edges of said top wall panel, said top tray member being disposed in telescoped relation over said bottom tray member with the top side and end wall panels being co-extensive with and overlapping the corresponding bottom side and end wall panels so as to cover the outside faces thereof, said overlapping side and end wall panels being secured to each other in rigid face engaging relation, said top member having end wall reinforcing panels cut therein which are each integrally hinged along an inner top end edge strip to [the] *a corresponding one of the* top end wall [panel] *panels* and which are folded down into oppositely disposed relation with the upwardly folded bottom end wall panels, said bottom end wall panel having a handle receiving cross slot adjacent the bottom end wall panel which is aligned with the handle receiving slot in the center of the associated top edge strip, said end wall reinforcing panel having a locking tongue on its bottom edge which is seated in said cross slot in the bottom wall forming panel and said end wall reinforcing panel being spaced inwardly of said bottom end wall forming panel in the center thereof a distance approximately equal to two thicknesses of the panel material, and corner connecting flaps integrally hinged to each of the opposite ends of each of said top and bottom side wall panels, said corner connecting flaps being folded inwardly and sandwiched between the end wall panels and the end wall reinforcing panels, and said corner connecting flaps extending substantially the full depth of said end walls and terminating short of the center of said end walls whereby to provide five panel thicknesses in each end wall at the corners of the container and to space the end wall reinforcing panels from the center portions of the end wall panels so as to define compartment forming recesses therebetween for accommodating wire handle members.

8. A tray-like shipping container which is fabricated from two separate corrugated paperboard blanks, said blanks being cut and scored so as to provide when folded and secured in container forming relation multi-panel side and end walls and a substantially open top wall, one of said blanks forming in the set up container a bottom tray member having a bottom wall panel and integral side and end wall panels hinged upwardly therefrom along the side and end edges of the bottom wall panel and the other one of said blanks forming a top tray member having a top wall panel and integral side and end wall panels hinged downwardly therefrom along the side and end edges, said top tray member being telescoped over said bottom tray member with the top side and end wall panels overlapping corresponding bottom side and end wall panels and engaging the outside faces thereof, said overlapping side and end wall panels being secured to each other in rigid face engaging relation, said top tray member having end wall reinforcing panels cut therein at opposite ends which are each integrally hinged along a narrow top end edge strip to a *corresponding one of the* top end wall [panel] *panels* and which are folded down inside the container into oppositely disposed relation with the upwardly folded end wall panels of the bottom tray member, corner connecting flaps integrally hinged to each of the opposite ends of each of said top and bottom side wall panels of the top and bottom tray members, said corner connecting flaps being folded inwardly between the end wall panels and the end wall reinforcing panels, said corner connecting flaps providing five panel thicknesses in portions of each end wall, the end wall panels and corner connecting panels being secured together in face contacting rigid relation so as to form a corner construction with high resistance to crushing due to weight when the containers are stacked upon each other, said top tray member having a center top cross strip and cross partition panels cut from center portions of said top tray forming blank, said top cross strip being of substantial width and being integrally connected at its opposite ends to the top edges of the top side wall forming panels so as to extend in the plane of the container top wall and between the top side wall panels, said cross partition panels being integrally hinged to opposite edges of said top cross strip and having flaps of substantial length on the edges thereof opposite their hinge connections, said cross partition panels being hinged downwardly into generally parallel spaced relation and the flaps extended through an elongate cross slot of substantial width in the center of the bottom wall panel, said flaps being turned over in the direction of the ends of the container and rigidly secured to the bottom face of said bottom wall panel, and said top cross strip, side walls and bottom wall having a severance line coinciding approximately with the longitudinal center of the container which provides a guide for dividing the container into two separate tray members.

9. A method of fabricating a corrugated paperboard container having multi-thickness side and end walls which comprises cutting and creasing a pair of rectangular blanks of foldable paperboard to provide in the one blank a bottom wall forming panel and integrally hinged side and end wall forming panels with the side wall panels having integrally hinged corner reinforcing panels and in the other blank a top wall forming panel and integrally hinged side and end wall forming panels with the side wall panels having integrally hinged corner connecting panels, said other blank being cut and scored in its center portion to provide inner end wall reinforcing panels hinged along top end edge forming strips to the end wall forming panels at the ends of said blank and a pair of cross partition forming panels hingedly connected by a top cross strip which is connected to the opposite side wall forming panels of the blank, folding and assembling the blanks with the outside faces of the side wall forming panels of said one blank in face engaging relation with the inside faces of the side wall panels of said other blank, securing the side wall panels together thereby forming a tube, folding into the plane of the end walls and securing together the end wall forming panels and the end wall reinforcing panels at the ends of the tube and folding the cross partition panels and securing the same to the bottom wall panel.

10. A method of fabricating a container having multi-thickness side and end walls which comprises cutting and creasing a pair of rectangular blanks of foldable paperboard to provide in the one blank a bottom wall forming panel, integrally hinged side and end wall forming panels and corner connecting panels on the ends of the side wall forming panels and in the other blank a top wall forming panel, integrally hinged side and end wall forming panels and corner connecting panels on the ends of the side wall forming panels, said other blank being cut and creased in its center portion to provide inner end wall reinforcing panels hinged along top end edge forming folds to the end wall forming panels at the ends of said blank and a pair of cross partition forming panels hingedly connected by a center top cross fold and integrally connected at opposite ends to the blank side wall forming panels, positioning the two blanks in a single plane with the outside face of a side wall forming panel at one side of said one blank in overlying face engaging relation with the inside face of the side wall panel at the other side of said other blank and securing said side wall forming panels together, folding the blanks upon each other with the outside face of the side wall forming panel at the other side of said one blank in overlying face engaging relation with the outside face of the side wall panel at the corresponding side of said other blank and securing the last mentioned side wall panels together while the blanks are in collapsed and flattened relation, opening up the tube thus formed, folding the end wall forming panels and the corner connecting panels into overlying relation at the ends of the tube, folding down into the tube the end wall reinforcing panels and the cross partition panels and securing the same to the end wall forming panels and corner connecting panels.

11. A method of fabricating a container having multi-thickness side and end walls which comprises cutting and creasing a pair of rectangular blanks of foldable paperboard to provide in the one blank a bottom wall forming panel, integrally hinged side and end wall forming panels and corner connecting panels on the ends of the side wall forming panels and in the other blank a top wall forming panel, integrally hinged side and end wall forming panels and corner connecting panels on the ends of the side wall forming panels, said other blank being cut and creased in it center portion to provide inner end wall reinforcing panels hinged along top end edge forming folds to the end wall forming panels at the ends of said blank and a pair of cross partition forming panels having locking tabs at the edges opposite said edge forming folds hingedly connected by a center top cross strip which is integrally connected at opposite ends to the blank side wall forming panels and having relatively narrow flap members along their bottom edges folding the end wall reinforcing panels and the cross partition panels of the one blank at right angles to the body of the blank, positioning the other blank in a parallel plane with the locking tabs on the end wall reinforcing panels and the flap members on the cross partition panels extending into cross slots in said other blank, folding the side wall forming panels of said one blank into overlying face engaging relation with the side wall panels of said other blank and securing said side wall forming panels together to form a tube, folding the end wall forming panels and the corner connecting panels into overlying relation at the ends of the tube and securing the same together and folding down and securing the flap members on the cross partition panels onto the outside face of the bottom wall forming panel.

12. A method of fabricating a corrugated paperboard container having multi-thickness side and end walls which comprises cutting and creasing a pair of rectangular blanks of foldable paperboard to provide in the one blank a bottom wall forming panel and integrally hinged side and end wall forming panels with the side wall panels having integrally hinged corner reinforcing panels and in the other blank a top wall forming panel and integrally hinged side and end wall forming panels with the side wall panels having integrally hinged corner connecting panels, said other blank being cut and scored in its center portion to provide inner end wall reinforcing panels hinged along top end edge forming strips to the end wall forming panels at the ends of said blank and a pair of cross partition forming panels hingedly connected by a top cross strip which is connected to the opposite side wall forming panels of the blank, folding and assembling the blanks in flattened condition with the outside faces of the side wall forming panels of said one blank in face engaging relation with the inside faces of the side wall panels of said other blank, securing the side wall panels together so as to form a tube, opening up the tube, folding and securing together the end wall forming panels at the ends of the tube and folding down into the tube the end wall reinforcing panels and the cross partition panels and securing the same to the infolded corner connecting panels and the bottom wall panel, respectively.

*13. A tray-like shipping container which is fabricated from two separate corrugated paperboard blanks, said blanks being cut and scored so as to provide, when folded and secured in container forming relation, multi-panel side and end walls and a substantially open top wall, one of said blanks constituting a bottom tray forming member having a bottom wall forming panel and integral side and end wall forming panels folded upwardly therefrom along the side and end edges and the other one of said blanks constituting a top tray forming member having a top wall forming panel and integral side and end wall forming panels folded downwardly therefrom along the side and end edges, said members being positioned relative to one another with their corresponding side wall forming panels in overlapping and face-engaging relation and their corresponding end wall forming panels in overlapping relation, said top member having end wall reinforcing panels cut therein which are each integrally hinged along a narrow top end edge strip to a corresponding one of the top end wall forming panels and which are folded down inside the container into overlapping relation with corresponding ones of said end wall forming panels at each end of said container, corner connecting flaps integrally hinged to the ends of said side wall forming panels of at least one of said top and bottom members to provide at least one flap at each corner of said container, each of said corner connecting flaps extending substantially the full depth of its corresponding end wall over at least a portion of its length, said corner connecting flaps being folded inwardly and sandwiched between and in face-engaging relation with said end wall panels, means for securing said top and bottom members to one another, with said side wall forming panels, said end wall panels and said corner connecting flaps so positioned, whereby multi-panel thicknesses are provided in the end portions of each end wall so as to form a rigid corner construction with high resistance to crushing forces resulting when the containers are stacked upon each other.*

*14. A tray-like shipping container which is fabricated from two separate corrugated paperboard blanks, said blanks being cut and scored so as to provide, when folded and secured in container forming relation, multi-panel side and end walls and a substantially open top wall, one of said blanks constituting a bottom tray forming member having a bottom wall forming panel and integral side and end wall forming panels folded upwardly therefrom along the side and end edges and the other one of said blanks constituting a top tray forming member having a top wall forming panel and integral side and end wall forming panels folded downwardly therefrom along the side and end edges, said members being positioned relative to one another with their corresponding side wall forming panels and their corresponding end wall forming panels in overlapping relation, end wall reinforcing panels integrally joined to a corresponding one of said end wall forming panels of said top and bottom members at the top of said end walls of said container and folded down into oppositely disposed relation with the end wall forming panels to which they are joined, corner connecting flaps integrally hinged to the ends of said side wall forming panels of at least one of the top and bottom members to provide at least one flap at each corner of said container, said corner connecting flaps being folded inwardly and sandwiched between and in face-engaging relation with said end wall panels, means for securing said top and bottom members to one another, with said side wall forming panels, said end wall panels and said corner connecting flaps so positioned, whereby multi-panel thicknesses are provided in end portions of each end wall so as to form a rigid corner construction with high resistance to crushing forces resulting when the containers are stacked upon each other.*

*15. A tray-like shipping container as recited in claim 14, and said end wall reinforcing panels are integrally joined to the ones of said end wall forming panels of said top and bottom members which are positioned on the outside at the ends of said container when said end wall forming panels are so positioned in overlapping relation.*

References Cited

The following references, cited by the Examiner, are of record in the patented file of this patent or the original patent.

UNITED STATES PATENTS

| | | | |
|---|---|---|---|
| 2,706,592 | 4/1955 | Scheller | 229—23 |
| 3,040,955 | 6/1962 | Paul | 229—27 |
| 3,074,615 | 1/1963 | Johnson | 229—34 |

JOSEPH R. LECLAIR, *Primary Examiner.*

R. PESHOCK, *Assistant Examiner.*